(No Model.) 2 Sheets—Sheet 1.

E. G. T. COLLES.
FEED WATER HEATER AND PURIFIER.

No. 360,207. Patented Mar. 29, 1887.

Witnesses:
J. A. Svedberg
A. M. P. Maschmeyer

Inventor:
E. G. T. Colles,
By T. C. Brecht,
Attorney.

(No Model.) 2 Sheets—Sheet 2.
E. G. T. COLLES.
FEED WATER HEATER AND PURIFIER.
No. 360,207. Patented Mar. 29, 1887.
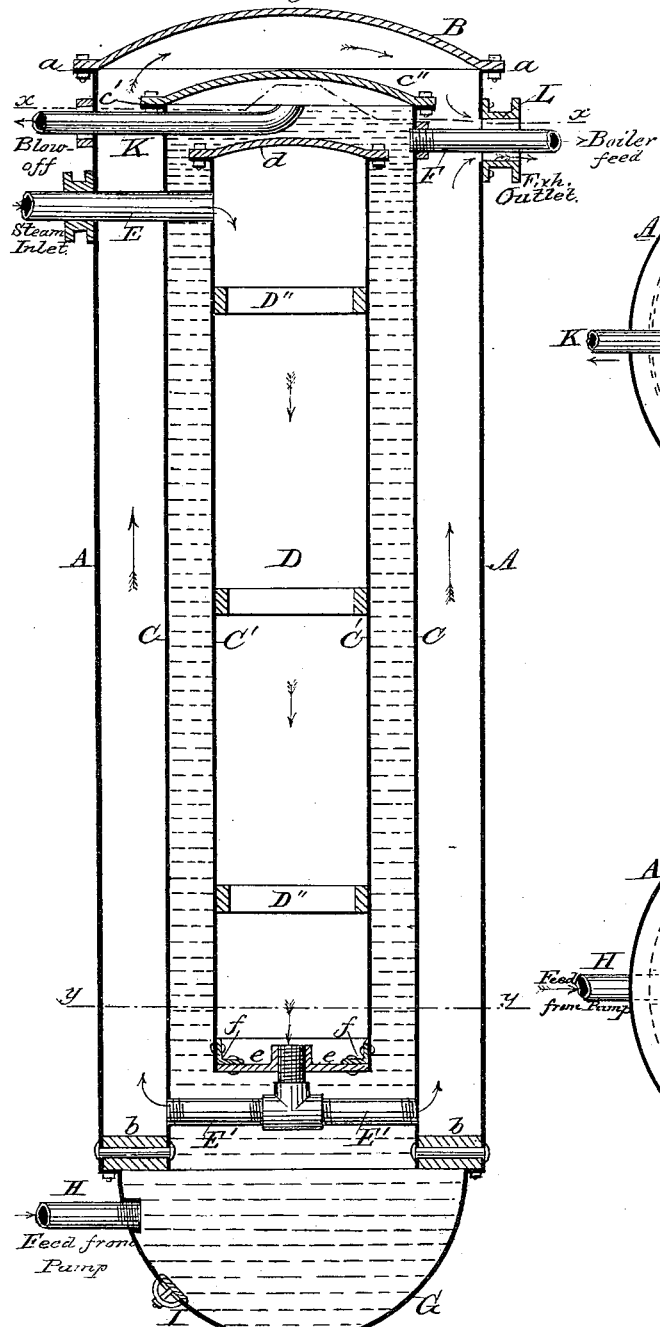
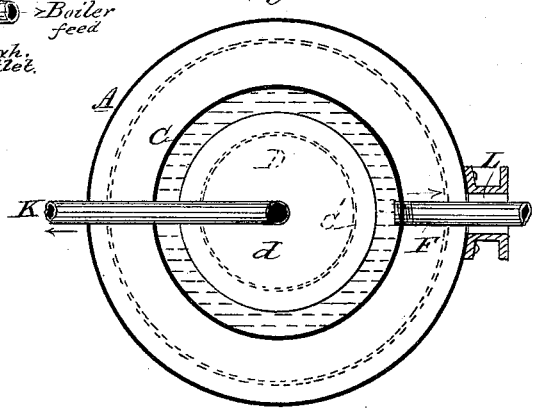
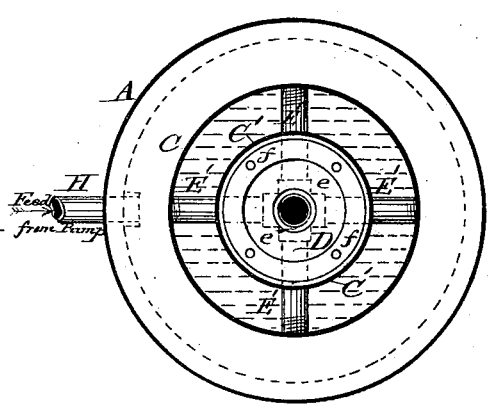
Witnesses:
J. A. Svedberg
A. M. P. Maschmeyer.
Inventor:
E. G. T. Colles,
By T. C. Brecht
Attorney.

UNITED STATES PATENT OFFICE.

EDWARD G. T. COLLES, OF CHICAGO, ILLINOIS.

FEED-WATER HEATER AND PURIFIER.

SPECIFICATION forming part of Letters Patent No. 360,207, dated March 29, 1887.

Application filed August 26, 1886. Serial No. 211,939. (No model.)

*To all whom it may concern:*

Be it known that I, EDWARD G. T. COLLES, a citizen of the United States, residing at Chicago, in the county of Cook and State of Illinois, have invented certain new and useful Improvements in Feed-Water Heaters and Purifiers; and I do hereby declare the following to be a full, clear, and exact description of the invention, such as will enable others skilled in the art to which it appertains to make and use the same.

My invention relates to improvements in feed-water heaters, in which the water during its passage through the heater to the boiler is heated by passing through an annular water-chamber closed at the top and communicating with a sediment or mud drum below, and surrounded by a steam-jacket communicating by a space above, and connected by a series of radial tubes passing through the water-chamber below and connected to a central heating-chamber entirely surrounded by water.

The objects of the invention are to dispense with the usual tubes employed in heaters, and thus avoid the numerous joints liable to leakage on account of the uneven contraction and expansion of the parts; to provide a maximum area of heating-surface to a minimum amount of water required, according to the size of the boiler; to simplify the construction and reduce the number of parts required; furthermore, to facilitate the accessibility to the different parts without the necessity of breaking numerous joints; also to reduce the number of joints usually required in heaters; and, finally, to provide for the general construction and arrangement of details, as hereinafter more definitely described, and specifically pointed out in the claims, reference being had to the accompanying drawings and the letters of reference marked thereon.

Similar letters of reference indicate the same parts in the several figures of the drawings, in which—

Figure 1:
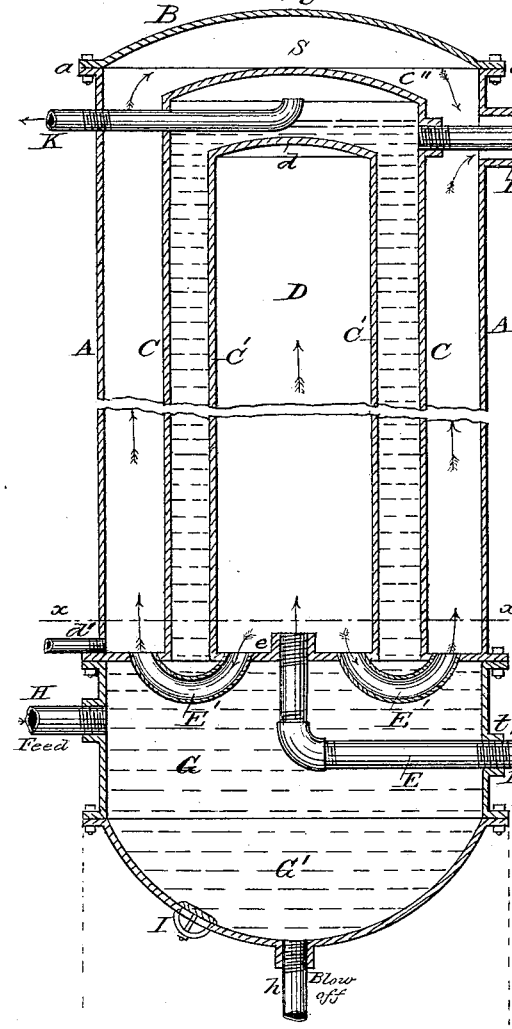
Figure 3:
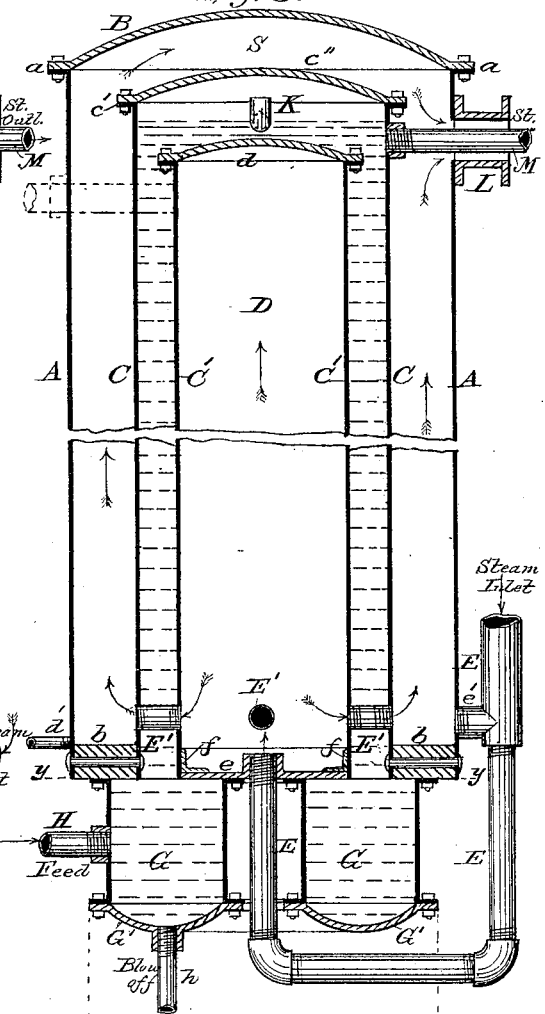
Figure 2:
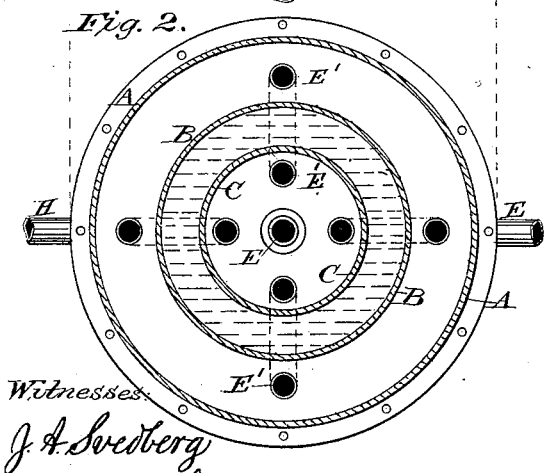
Figure 4:
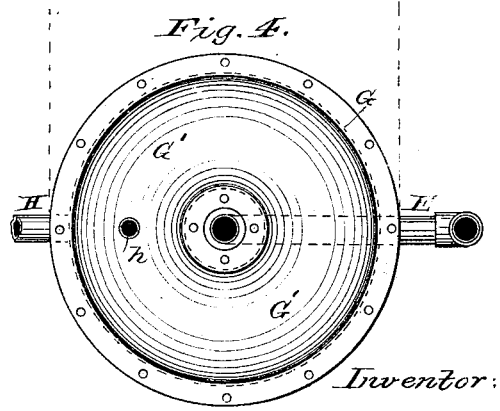

Figure 1 represents a vertical central section of a heater embodying my invention. Fig. 2 is a horizontal section on line $x\ x$ of Fig. 1. Fig. 3 is a vertical central section of a modification of Fig. 1. Fig. 4 is a horizontal section on line $y\ y$ of Fig. 3. Figs. 5, 6, and 7 are similar views of another modification.

In said drawings, A represents the outer cylindrical shell of the feed-water heater closed at the top by a removable cover, B, bolted to a flange, $a$, with suitable packing between them, as also between all joints requiring it. A cylinder, C, secured to the shell A by a band, $b$, or head $e$ by rivets or bolts, forms the steam-jacket of the heater. Within said cylinder is placed another cylinder, C', and forming with the cylinder C an annular water-chamber and a central steam or heating chamber, D, closed by a removable or fixed head or cover, $d$. The lower end of the heating-chamber is closed by a solid head, $e$, or a head, $e$, secured by an angle-iron ring, $f$. The cylinder C is closed at its upper end by a fixed or a removable head or cover, $c''$, bolted to the flange $c'$ of said cylinder. The exhaust-steam-inlet pipe E passes through a suitable stuffing-box, $t$, in the mud-drum G, and is connected to the lower head, $e$, of the inner cylinder. The steam-jacket and said inner cylinder communicate with each other by two or more curved tubes or branches, E', while the annular steam-jacket is connected by a space, $s$, at the top, formed between the covers B and $c''$. The sediment-chamber or mud-drum G is bolted to lower end of the shell, and is composed of the parts G, of cylindrical form, and the part G', of concave form, and it is provided with one or more hand-holes, I, for gaining access to it. The feed-water pipe H is connected to said mud-drum and communicates with the pump or other source of supply. In the lower part of the mud-drum is arranged a pipe, $h$, for blowing out the sediment, mud, &c. A pipe, K, extending from the surface of the water in the annular water-chamber, through the side of the shell A, serves as a surface blow-off to remove the scum and impurities usually accumulating on the surface by the ebullition of the water. The feed-pipe M to the boiler is attached to the upper part of the annular water-chamber, and passes through an enlarged nozzle, L, through which the escaping steam passes, and may be conveyed to a condenser, or to the atmosphere, as desired. In this instance the heater is made of cast-iron, and the shell A, the cylinders C C', lower head, e, and the covers c'' and d are cast in one piece and the mud-drum in another piece, and the pipe-fittings are then applied, as required.

All pipes must be provided with check-valves, stop-valves, or cocks, as required.

In the modification shown in Figs. 3 and 4 the general construction is similar to that shown in Fig. 1; but the heater is made of wrought-iron and has cast-iron removable heads. The mud-drum is made of annular form, and the steam-pipe is provided with a branch-pipe, e', communicating with the steam-jacket, in addition to the central connection to the head e. The tubes E' are radially connected to the steam-jacket and the central steam-chamber D. A drip-pipe, d', serves to remove any condense water accumulating in the steam-jacket. The cylinders A and C are riveted or bolted to a band, b, and the mud-drum G G' is also bolted to said head.

In the modification shown in Figs. 5, 6, and 7 the steam is conveyed first to the central cylinder, D, by the steam-pipe E, passing through a suitable stuffing-box in the shell A and through the annular water-chamber. The central steam-chamber, D, is entirely surrounded by water, and is provided with two or more bands, D'', to prevent said chamber from collapsing. The steam passes through the head e and connects to a union-joint, and thence by the tubes E' to the steam-jacket, and finally escapes through the nozzle L, while the feed-pipe F to the boiler passes through said nozzle. The surface blow-off pipe K is also arranged to pass through a stuffing-box on the shell A.

If desired, heated air or live steam may be employed instead of exhaust-steam for heating the water.

The operation will be readily understood by those skilled in the art, and will require no further elucidation here.

I am aware of the Patents Nos. 173,856 and 328,587, and disclaim the construction therein shown; but,

Having thus described my invention, what I claim, and desire to secure by Letters Patent, is—

1. An annular water-chamber surrounded on all sides by steam-spaces, excepting its lower end, connecting with the mud-drum, in combination with inlet and outlet steam and water pipes, and provided with communicating branch pipes E', arranged substantially as set forth.

2. The combination of a steam-jacket composed of the shells A and C, united by an annular band, b, at their lower ends to form a close joint and communicating tubes E', and a removable head above, with the annular water-chamber inclosing a heating-cylinder, D, and having inlet and outlet pipes, arranged substantially as set forth.

3. The combination of an annular shell provided with a removable cover and a central heating-chamber having communicating tubes E' with an annular water-chamber having open communication at its top and at its bottom with the mud-drum, and provided with inlet and outlet steam and water pipes and a surface and bottom blow-pipe, all arranged substantially as specified.

4. The combination of a shell, A, containing cylinders C C', forming an annular water-chamber, and a steam-jacket having communicating tubes E', with a mud-drum, tubes E', and the inlet and outlet pipes and blow-off pipes, all arranged substantially as set forth.

5. In a feed-water heater, a closed interior cylinder provided with strengthening-bands, in combination with a water-chamber, a steam-jacket, and a mud-drum, when all constructed and arranged substantially as shown and specified.

In testimony whereof I hereby affix my signature in presence of two witnesses.

EDWARD G. T. COLLES.

Witnesses:
JOHN A. SVEDBERG,
A. M. P. MASCHMEYER.